United States Patent [19]

Jahnes et al.

[11] Patent Number: 5,399,386

[45] Date of Patent: Mar. 21, 1995

[54] IN-SITU TEXTURING OF A THIN FILM MAGNETIC MEDIUM

[75] Inventors: Christopher V. Jahnes, Monsey, N.Y.; Mohammad T. Mirzamaani, San Jose, Calif.; Michael A. Russak, Brewster, N.Y.

[73] Assignee: International Business Machines Corporation, Armonk, N.Y.

[21] Appl. No.: 997,843

[22] Filed: Dec. 29, 1992

[51] Int. Cl.⁶ .............................................. H01F 10/02
[52] U.S. Cl. ................................. 427/531; 204/192.1; 427/131; 427/132; 427/203; 427/205; 427/527; 427/528; 427/529
[58] Field of Search ............... 427/131, 132, 203, 205, 427/528, 529, 531, 527; 204/192.1

[56] References Cited

U.S. PATENT DOCUMENTS

| | | | |
|---|---|---|---|
| 4,539,264 | 9/1985 | Yazawa et al. | 428/621 |
| 5,053,250 | 10/1991 | Baseman et al. | 427/131 |
| 5,063,120 | 11/1991 | Edmonson et al. | 428/694 |
| 5,134,038 | 7/1992 | Baseman et al. | 428/611 |

OTHER PUBLICATIONS

Mirzamaani, Janes & Russak, "Thin film disks with transient metal underlayers," IEEE Trans., vol. 28, No. 5, Sep. 1992, pp. 3090–3092.

*Primary Examiner*—Bernard Pianalto
*Attorney, Agent, or Firm*—James C. Wilson

[57] ABSTRACT

A magnetic storage medium is composed of a non-wettable substrate upon which a transient liquid metal layer is deposited and maintained as a distribution of discontinuous liquid features. An intermediate metal layer is subsequently deposited in-situ in an atmosphere comprising oxygen and at least one inert gas. A magnetic layer is then deposited on the intermediate metal layer. The surface topology and magnetic characteristics of the medium are controlled by adjusting the thickness of the TLM layer and the conditions under which the TLM layer, intermediate metal layer, and magnetic layer are deposited.

20 Claims, 7 Drawing Sheets

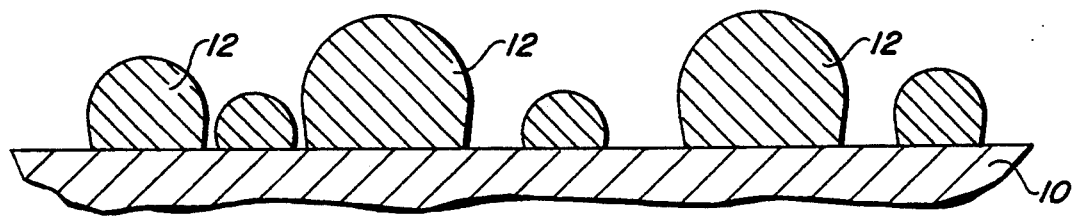
FIG_1A
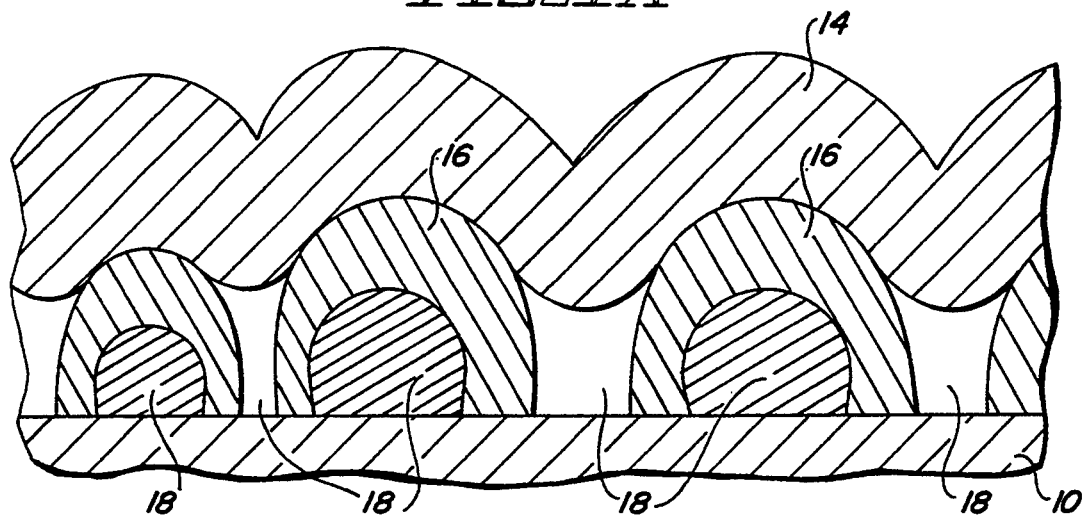
FIG_1B
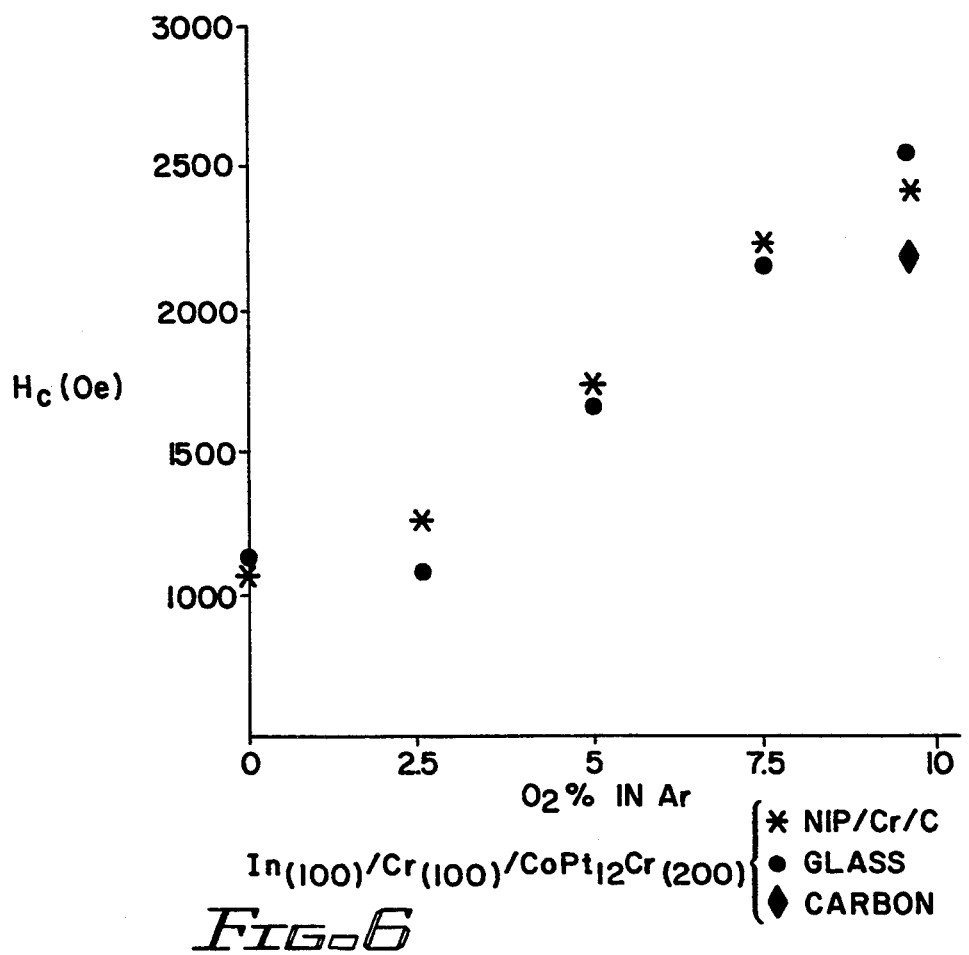
In(100)/Cr(100)/CoPt$_{12}$Cr(200) { * NIP/Cr/C, ● GLASS, ◆ CARBON }
FIG_6

IN-SITU TEXTURING OF A THIN FILM MAGNETIC MEDIUM

FIELD OF THE INVENTION

The present invention relates generally to magnetic thin film recording disks and in particular to an improved method of manufacturing a magnetic thin film medium with controlled grain structure and surface roughness.

BACKGROUND OF THE INVENTION

In seeking higher areal recording densities on rigid magnetic disk surfaces, it is known that thin film media have significant advantages over particulate disk media. One of these advantages is the extremely smooth surface exhibited by thin film disks. Because the recording density of a magnetic recording disk is inversely proportional to the distance (fly height) between the disk and the transducing head with which the information is being recorded, the surface of the disk should be extremely smooth to permit a low fly height. However, the extreme smoothness of a thin film disk generally results in a high contact area between the disk and head which, in turn, results in a high value of stiction or friction. High stiction is undesirable because it can cause severe damage to the disk and recording head when the head suddenly breaks free from the disk surface, once disk rotation is initiated. Additionally, as the disk begins to rotate, damaging forces are applied tangentially to the head suspension and the disk drive motor.

In order to improve the tribology of the disk, an overcoat, typically carbon, as well as a lubricant are applied to the outermost film layer of the disk. However, extremely smooth disks, even with a lubricant coating, may still exhibit unacceptably high stiction levels. Moreover, over a period of time the lubricant can become dislodged from the disk surface.

One way to overcome the problems of high stiction while promoting retention of the lubricant is to roughen the surface of the substrate, typically a nickel-phosphorous coated aluminum-magnesium disk, prior to the deposition of the magnetic layer. This is customarily done by a mechanical abrasive technique and is known in the magnetic disk industry as texturing. However, mechanical texturing forms weldments and asperities along the texture lines. These weldments can require an increased fly height and cause severe wear of the magnetic layer during operation of the disk. In addition, the surface texturing process is time consuming, costly, difficult to control, and has not been applied successfully to glass, ceramic or amorphous carbon substrates. Therefore, it is desirable to texture or roughen the substrate surface by means other than mechanical abrasion while not adversely affecting the disk's magnetic properties.

U.S Pat. Nos. 5,053,250 and 5,134,038, assigned to the same assignee as the present invention and hereby incorporated by reference, describe a method and structure that eliminates the need for mechanical texturing by applying an underlayer of a transient liquid metal (TLM) film, preferably gallium, indium, tin, or their alloys, between a non-wettable substrate and the magnetic thin film. The transient liquid metal layer is applied while the substrate, which is not wettable by the liquid metal, is maintained at a condition at which the initially liquid metal remains in a liquid state, and preferably at a temperature above the melting point of the transient liquid metal. The result is that the liquid metal is caused to "ball-up" and form a layer of disconnected molten metal features.

The substrate is maintained at a temperature above or close to the melting point of the transient liquid metal during sputter deposition of the TLM layer onto the substrate. The outer magnetic layer, which may be a binary, ternary or quaternary cobalt-based alloy, such as CoCr, CoRe, CoPt, CoNi, CoNiCr, CoPtCr, CoPtCrTa, CoNiCrTa, or CoPtCrB, is then deposited onto the transient liquid metal at either an elevated temperature above the melting point of the transient liquid metal or alternatively at a more conventional lower temperature at which the TLM layer features, while undercooled, are nevertheless metastably liquid. The transient liquid metal becomes alloyed with the magnetic layer thereby imparting to the magnetic layer a controlled topology which provides a disk surface with improved tribology. The resulting magnetic medium does not include a pure transient liquid metal underlayer.

However, the above described alloying between the TLM layer and the magnetic layer is often undesirable as it causes degraded magnetic performance. Specifically, the interaction between the TLM layer and the magnetic layer can lower the remanent magnetization and coercivity of the magnetic medium. Therefore, it is often desirable to place an intermediate metal layer between the TLM layer and the magnetic layer. Preferred metal films for the interlayer are chromium, molybdenum, vanadium, palladium, titanium, ruthenium, rhodium, niobium, aluminum and platinum, or alloys of these metals. The advantages of such an interlayer and a method of depositing it are described in U.S. Pat. No. 5,063,120, assigned to the same assignee as the present invention and hereby incorporated by reference. In addition to reducing the interaction between the layers, the interlayer provides improved magnetic performance by aligning the (100) plane of the interlayer parallel to the recording surface. This allows the cobalt alloy atoms of the magnetic layer to attach to the interlayer structure with their C axis parallel to the (100) plane.

Unfortunately, the use of such desirable metal layers between the underlayer and the magnetic layer can lead to difficulties in maintaining the disconnected metal features of the TLM layer. In particular, in-situ deposition (sequential deposition without a vacuum break) of a metal layer on top of a TLM underlayer causes the disconnected molten features of the underlayer to coalesce and form a continuous film, thereby destroying the desirable texturing effect of the transient liquid metal underlayer. A method is needed whereby the desirable interlayer can be deposited without causing the TLM layer to coalesce. Furthermore, the method should be adaptable to in-situ deposition of all the required films. That is, the technique should allow the required films to be deposited in a single deposition apparatus without a need to transfer the magnetic medium between deposition tools. In-situ deposition is preferable because it reduces contamination, handling, and process control problems that arise whenever a substrate is transferred between separate sputtering systems.

SUMMARY OF THE INVENTION

The present invention overcomes the above described difficulties by depositing the intermediate metal layer in an atmosphere of inert gases and oxygen under controlled conditions. The oxygen passivates the TLM layer, thereby preventing the coalescence of the molten TLM features into a continuous film.

The proportion of oxygen in the deposition atmosphere is critical. The proportion must be large enough to effectively passivate the TLM layer without being so large as to degrade the magnetic properties of the thin film structure. Depending on the geometry and pumping configuration of the deposition apparatus used, proportions of oxygen as low as 0.2% by volume of the total inlet gas flow are effective for this purpose. Subsequent to the deposition of the intermediate rectal layer, the magnetic layer is deposited within the same deposition apparatus.

The resultant magnetic medium comprises a non-wetting substrate, a transient liquid metal underlayer, an intermediate metal layer and a magnetic layer where the surface roughness of the magnetic layer is controllable by adjusting the transient liquid metal underlayer thickness and deposition temperature. The present invention thus provides a method for the in-situ fabrication of a magnetic medium with controlled grain structure, surface topology, and magnetic characteristics.

Further objects, features and advantages of the invention will become apparent from the following specification and accompanying drawings.

BRIEF DESCRIPTION OF THE DRAWINGS

FIG. 1A is a cross-sectional representation of a transient liquid metal layer deposited on a substrate in accordance with the present invention;

FIG. 1B is a cross-sectional representation of a magnetic medium manufactured in accordance with the present invention;

FIG. 6 is a graphical representation of the coercivity of a 200 angstrom Co-Pt-Cr alloy film deposited on a 100 angstroms thick chromium intermediate metal layer deposited on a 100 angstrom indium TLM layer under varying oxygen concentrations;

DETAILED DESCRIPTION

Figure 2A:
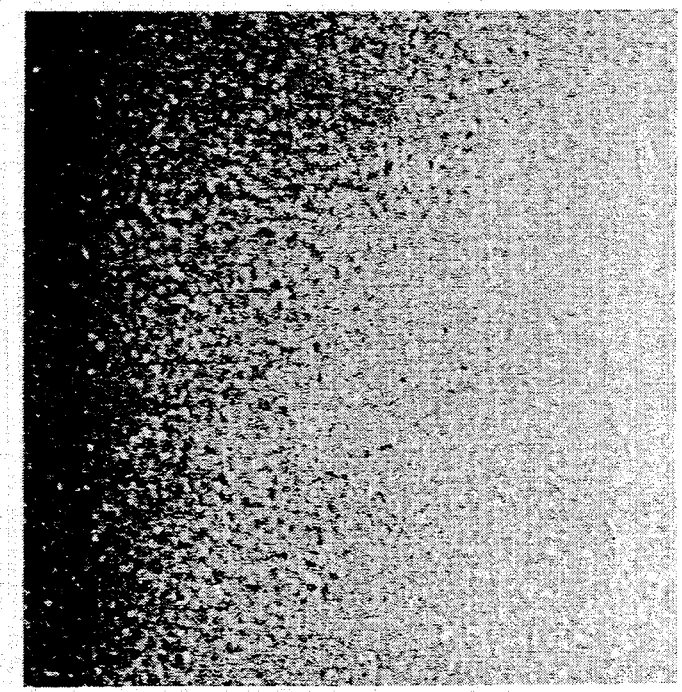
FIGS. 2A, 2B, 2C and 2D are SEM images of the surface topology of evaporated gallium films of 25, 50, 100 and 200 angstrom average thickness respectively applied to a $SiO_2$ substrate.

Referring now to the figures and to FIG. 1A in particular, there is shown in accordance with the present invention a substrate 10 such as silicon dioxide, glass, amorphous carbon, polymer or thin coating thereof on any suitable non-magnetic storage disk material. The substrate is selected to be inherently non-wettable by liquid metals or is coated with a low surface tension layer so as to be made non-wettable. As used in the context of this invention, the term non-wettable refers to the break up of a liquid film to form a distribution of disconnected liquid metal features due to the lack of wetting or interaction between a substrate and the liquid metal.

Deposited upon the substrate is an underlayer of a transient liquid metal 12 such as gallium, indium, tin, bismuth, lead, cadmium, mercury, selenium, tellurium and their alloys with other elements, including silver, palladium, platinum, aluminum or gold as well as binary or ternary compounds of the transient liquid metals themselves. The preferred transient liquid metals are gallium, indium, tin and their alloys. The average film 12 thickness is in the range between approximately 25 angstroms and 300 angstroms, and preferably in the range between 25 angstroms and 100 angstroms. The term transient liquid metal layer refers to the temporary existence of the liquid metal layer, until a deposition of a sufficient quantity of an intermediate metal layer results in the dissolution and reaction of the liquid metal in the intermediate rectal layer, with the substantially complete disappearance of the liquid phase from the magnetic medium structure. As a result, in the final magnetic medium there is no distinct transient liquid metal layer, but rather there is an intergranular segregation of such metal, as shown in FIG. 1B. The transient liquid metal layer is applied to the substrate while the substrate is maintained at a temperature above the melting point of the transient liquid metal. In the example of a gallium film, the substrate is held at a temperature above approximately 30° C. during deposition. Due to the poor wetting of the substrate by the liquid metal, the liquid metal forms spherical features as shown in FIG. 1A.

The transient liquid metal film underlayer is applied to the substrate by means such as vapor deposition, sputtering, ion beam deposition, evaporation, plating or other deposition techniques as are known in the art, with sputtering being the preferred method, while the substrate is maintained at a temperature above the melting point of the transient liquid metal. It will be apparent to those skilled in the art that the area of the medium surface subject to deposition can be limited by the use of masking techniques.

FIGS. 2A, 2B, 2C and 2D are scanning electron microscope images of evaporated gallium films deposited over a silicon dioxide substrate at a temperature above the melting point of gallium. By virtue of the non-wettability of the substrate, rather than the gallium forming a smooth uniform film layer, the gallium forms many spherical structures or features. The quantity of the spherical structures and the size distribution of the structures are dependent upon the average thickness of the gallium layer, temperature of the substrate during deposition, and the degree of wetting of the substrate by the transient liquid metal. The degree of wetting of the substrate can be affected by the addition of alloying elements to the gallium, particularly alloying elements that strongly interact with the substrate material.

Figure 2B:
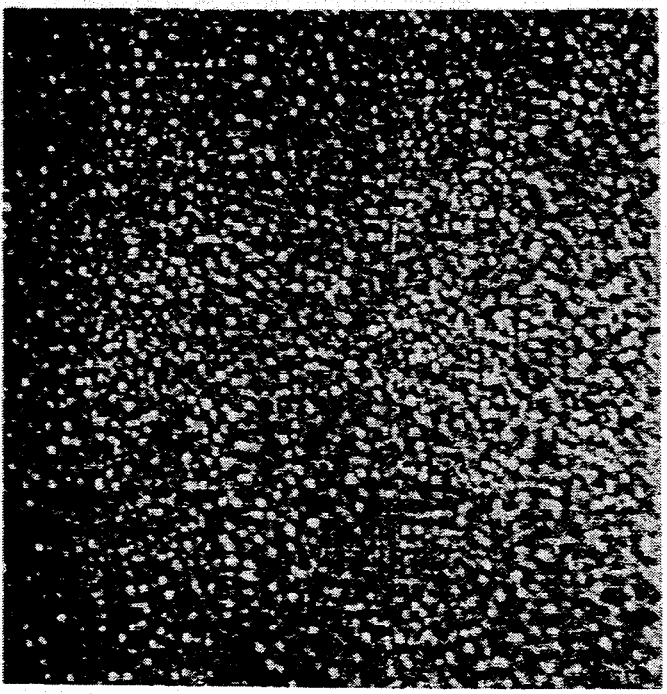
Figure 2C:
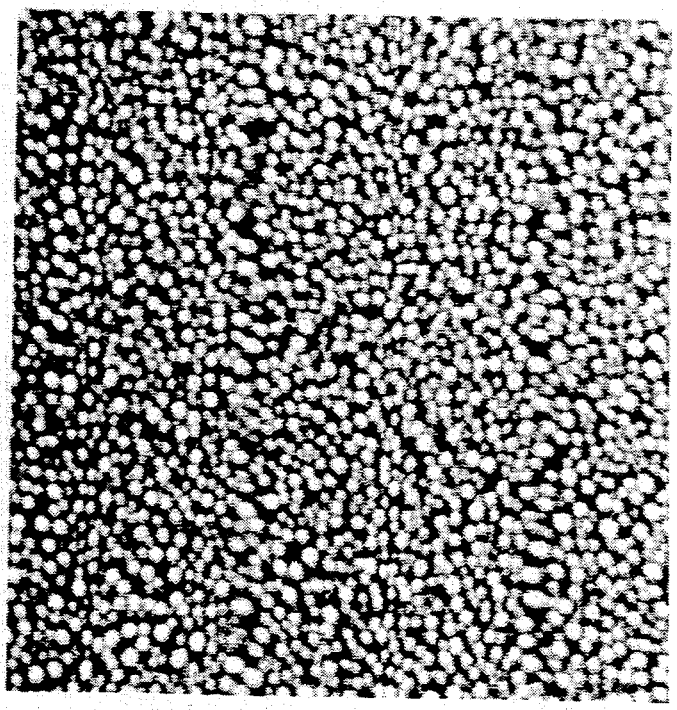
Figure 2D:
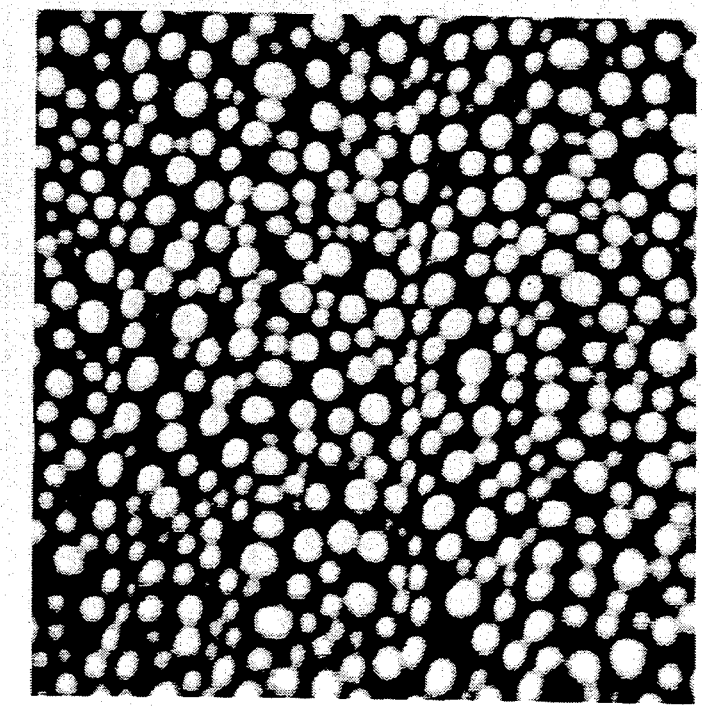

The thickness dependency in the case of pure gallium deposited onto a silicon dioxide substrate maintained at 32° C. to 35° C. during deposition is shown in FIGS. 2A, 2B, 2C and 2D. FIG. 2A is a scanning electron microscope image of a 25 angstrom thick layer of evaporated gallium film on a silicon dioxide substrate. FIG. 2B is a scanning electron microscope image of a 50 angstrom thick layer of evaporated gallium film on a silicon dioxide substrate. FIG. 2C is a scanning electron microscope image of a 100 angstrom thick layer of evaporated gallium film on a silicon dioxide substrate. FIG. 2D is a scanning electron microscope image of a 200 angstrom thick layer of evaporated gallium film on a silicon dioxide substrate. It will be apparent from the FIGS. 2A to 2D that the quantity of the spherical structures per unit surface area decreases with increasing gallium film layer thickness and the size of the spherical structures increases with increasing gallium film layer thickness.

While it is feasible to deposit a magnetic layer directly on the TLM layer, reactions between the transient liquid metal and the magnetic alloy, resulting in the overall reduction of the magnetic phase, can drastically reduce remanent magnetization and therefore the read-write characteristics of the magnetic medium. For this reason, it is preferable to deposit an intermediate metal layer 16 between the TLM layer and the magnetic layer. The intermediate metal layer forms an intermetallic compound with the TLM. As shown schematically in FIG. 1B, the intermediate metal layer 16 of chromium, palladium, tantalum, molybdenum, vanadium, titanium, ruthenium, rhodium, niobium, or aluminum, with chromium being the preferred material, is deposited on the transient liquid metal film 12 deposited on substrate 10.

It is very desirable that the intermediate metal layer be deposited in-situ, that is, in the same deposition tool used to deposit the TLM layer. In-situ deposition is preferable because it increases throughput while reducing the contamination, handling, and process control problems that arise whenever a substrate is transferred between separate sputtering systems. Several commercially available sputtering tools are capable of depositing dissimilar materials during immediately subsequent depositions.

Figure 3:
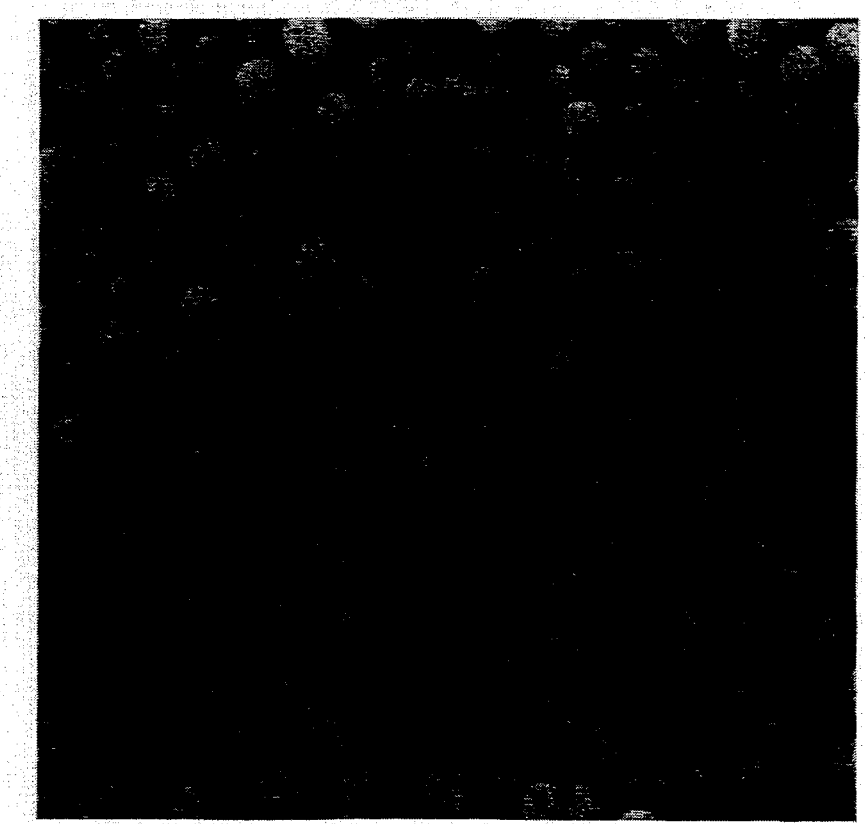
FIG. 3 is an SEM image of the surface topology of a 100 angstrom layer of indium deposited on an $SiO_2$ substrate.
Figure 4:
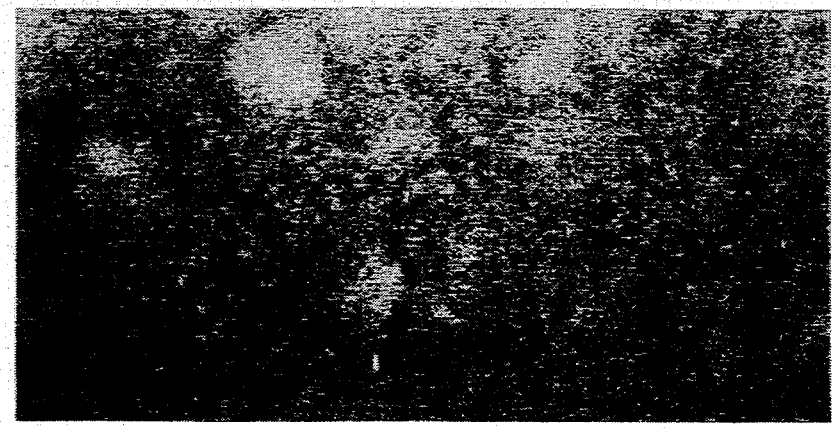
FIG. 4 is an SEM image of the surface topology of a 100 angstrom layer of chromium sputter deposited in-situ on 100 angstroms of indium in an atmosphere of argon.

Unfortunately, in-situ deposition of a chromium interlayer on top of the TLM layer results in the disconnected molten features coalescing and forming a continuous and smooth film. This effect is illustrated in FIG. 3 and FIG. 4. FIG. 3 is a scanning electron microscope image of a 100 angstrom sputter deposited indium film deposited over a silicon dioxide substrate at a temperature above the melting point of indium. FIG. 4 is an SEM image of the surface topology of a 100 angstrom layer of chromium deposited in-situ on top of the structure of FIG. 3 in a conventional argon sputtering atmosphere. A comparison of FIG. 3 and FIG. 4 clearly demonstrates the coalescence of the spherical features and the formation of a continuous film. Such a film is unacceptable as it eliminates the desirable texturing effect of the disconnected TLM features.

It is hypothesized that the following mechanism is responsible for the coalescence of the spheres. In the area between the individual TLM spheres, there is thought to exist a monolayer of the TLM material. As the interlayer material is deposited, it alloys with the monolayer, depleting the concentration of pure TLM material in the area between the spheres. The resulting concentration gradient causes the TLM material in the spheres to diffuse laterally into the area between the spheres. The result is a smoothing of the TLM spheres into a continuous film.

Figure 5:
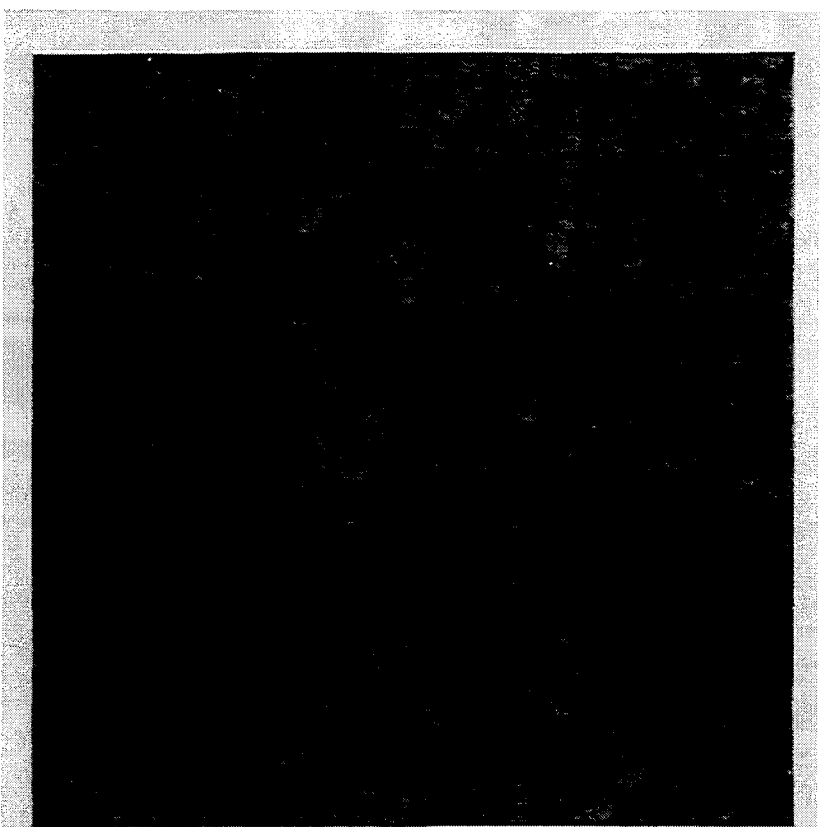
FIG. 5 is an SEM image of the surface topology of a 100 angstrom layer of chromium sputter deposited in-situ on 100 angstroms of indium in an atmosphere of argon and oxygen.

In order to prevent coalescence, the chromium interlayer is deposited in an atmosphere comprising oxygen. FIG. 5 is an SEM image of the surface topology of a 100 angstroms layer of chromium deposited in-situ on 100 angstroms of indium in an atmosphere of argon and oxygen. The spherical topography is maintained under these deposition conditions and the coalescence of the spheres is avoided. It is hypothesized that the oxygen acts to prevent coalescence of the TLM layer by inhibiting surface diffusion of the TLM material away from the spheres. In addition, the formation of an oxide of the TLM material and the intermediate metal layer material further inhibits diffusion due to the lower surface diffusion of oxides in general.

During the sputtering of the intermediate metal layer the temperature of the substrate is maintained above the melting point of the selected TLM layer. The intermediate layer is deposited at pressures ranging from 5 to 50 millitorr in an atmosphere of argon and oxygen. The percentage of oxygen in the sputtering atmosphere is controlled with a flow meter and may vary from 0.2 to 30% of the total inlet gas flow depending on the geometry and pumping speed of the sputtering apparatus used. Higher concentrations of oxygen quickly oxidize the target in a DC sputtering system and prevent further metal deposition or result in defective films. Oxidation of the sputtering target is especially rapid if the sputtering chamber is large or the pumping speed is low. In such cases, low percentages of oxygen must be used. Much higher oxygen concentrations can be used when the sputter deposition is performed in the radio-frequency sputtering chambers typically used to deposit insulating films.

The effect of increased oxygen concentration in the sputtering atmosphere is illustrated in FIG. 6 which is a graphical representation of the coercivity of a Co-Pt-Cr alloy film deposited on a chromium intermediate metal layer deposited on an indium TLM layer under varying oxygen concentrations. As the graph illustrates, the coercivity of the magnetic structure increases as the percentage of oxygen increases between 0 and 10% of the total inlet gas flow. Depending on the geometry of the sputtering tool, ratios above 20 or 30% rapidly oxidize the target and result in a magnetic layer with reduced coercivity.

The intermediate metal film 16 is deposited onto the transient liquid metal layer in a conventional manner with the substrate and transient liquid metal being held either at a temperature above the melting point of the transient liquid metal or at any lower conventionally used temperature at which the transient liquid metal underlayer still exists in a liquid state. If the underlayer is allowed to solidify prior to deposition of the intermediate metal layer, it will exist in the resulting magnetic medium as a discrete layer and may adversely affect the mechanical and adhesion properties of the magnetic disk.

The magnetic film preferably is Co-Pt-Cr but any other magnetic thin film material may also be used in practicing the invention. The thickness of the magnetic film is in the range between 100 angstroms and 1500 angstroms, preferably in the range between 200 angstroms and 1000 angstroms. The surface of magnetic film 14 generally follows the topology of the spherical structures of the transient liquid metal layer and exhibits regions of increased concentration of the transient liquid metal 18, e.g. indium, in the area between the resulting magnetic film grains and in the area where the spherical structures were originally located.

As is well known in the art, a top coat, typically carbon, and a lubricant can be applied to the magnetic medium and is required for many applications. Such a treatment is fully compatible with the magnetic medium described herein.

In manufacturing a preferred embodiment of the medium a 100 angstrom thick chromium layer is sputter deposited over a 100 angstrom layer of indium which was previously sputter deposited on a non-wetting substrate. The indium is deposited at a pressure of 3 to 20 millitorr with oxygen comprising 2–20% of the gas flow to the sputtering chamber. The indium will alloy with the chromium layer and the indium layer will in effect disappear as a distinct film layer. The magnetic layer preferably is a 100–500 angstrom sputter deposited Co-Pt-Cr film.

Figure 7:
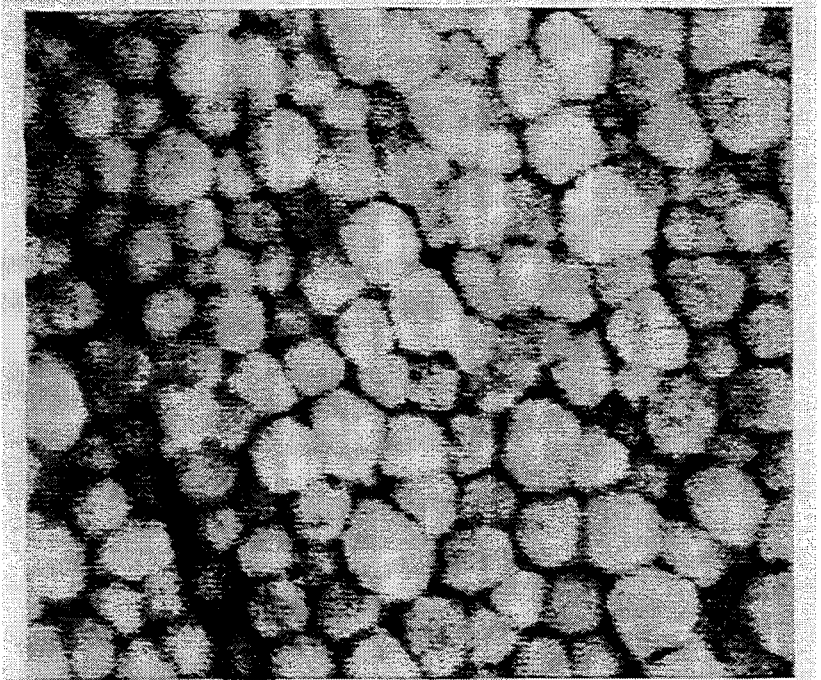
FIG. 7 is an SEM image of the surface topology of a 200 angstrom Co-Pt-Cr alloy film deposited on a 100 angstrom layer of chromium sputter deposited in-situ on 200 angstroms of indium in an atmosphere of argon and oxygen.

Examination of the FIGS. 2A, 2B, 2C and 2D shows that with increasing underlayer film thickness, there are fewer and larger spherical structures on the surface of the substrate. As shown in FIG. 5 and FIG. 7, this topology is essentially repeated by the deposited chromium intermediate layer and magnetic layer. It will be apparent to those skilled in the art that the surface topology and morphology of the outer magnetic layer is controllable by the selection of the average thickness of the transient liquid metal film underlayer.

An important consideration in the manufacture of a multilayered magnetic medium is the effect each of the layers has with regard to the coercive force of the magnetic material layer and the coercive squareness ratio. The effect of the textured TLM underlayer on the magnetic layer is believed to be due to the disparity of conditions for film nucleation and growth on the surface of the TLM spheres and on the silicon oxide. The TLM layer creates magnetic grains with less exchange coupling between adjacent magnetic grains and less magnetostatic interaction which, in turn, causes higher coercivity and lower coercive squareness.

Figure 8:
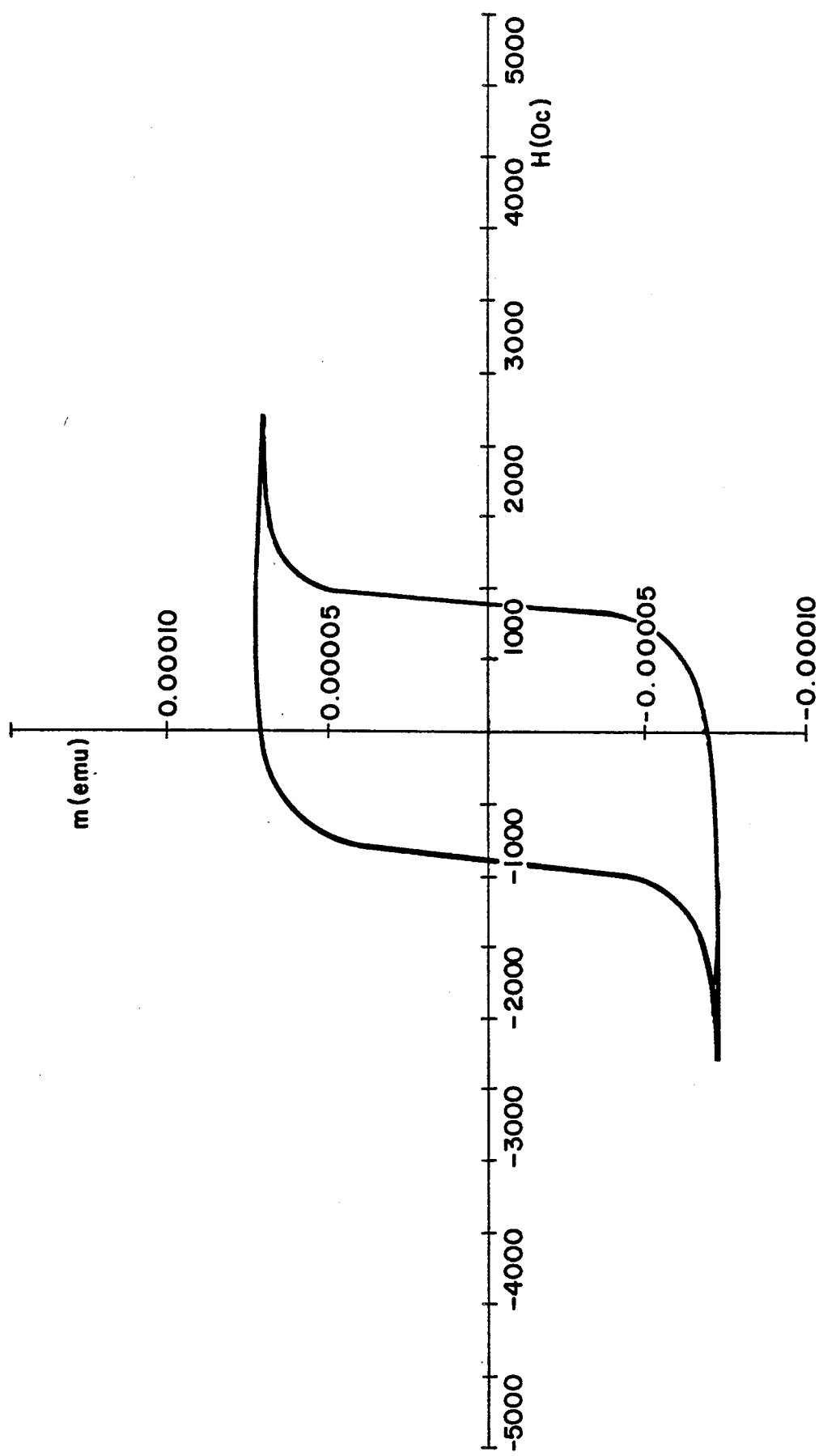
FIG. 8 is a graphical representation of the magnetic properties of a 200 angstroms thick Co-Pt-Cr film sputtered on a 100 angstrom chromium interlayer sputtered in an argon atmosphere onto a 100 angstroms thick layer of indium deposited onto a silicon dioxide substrate.
Figure 9:
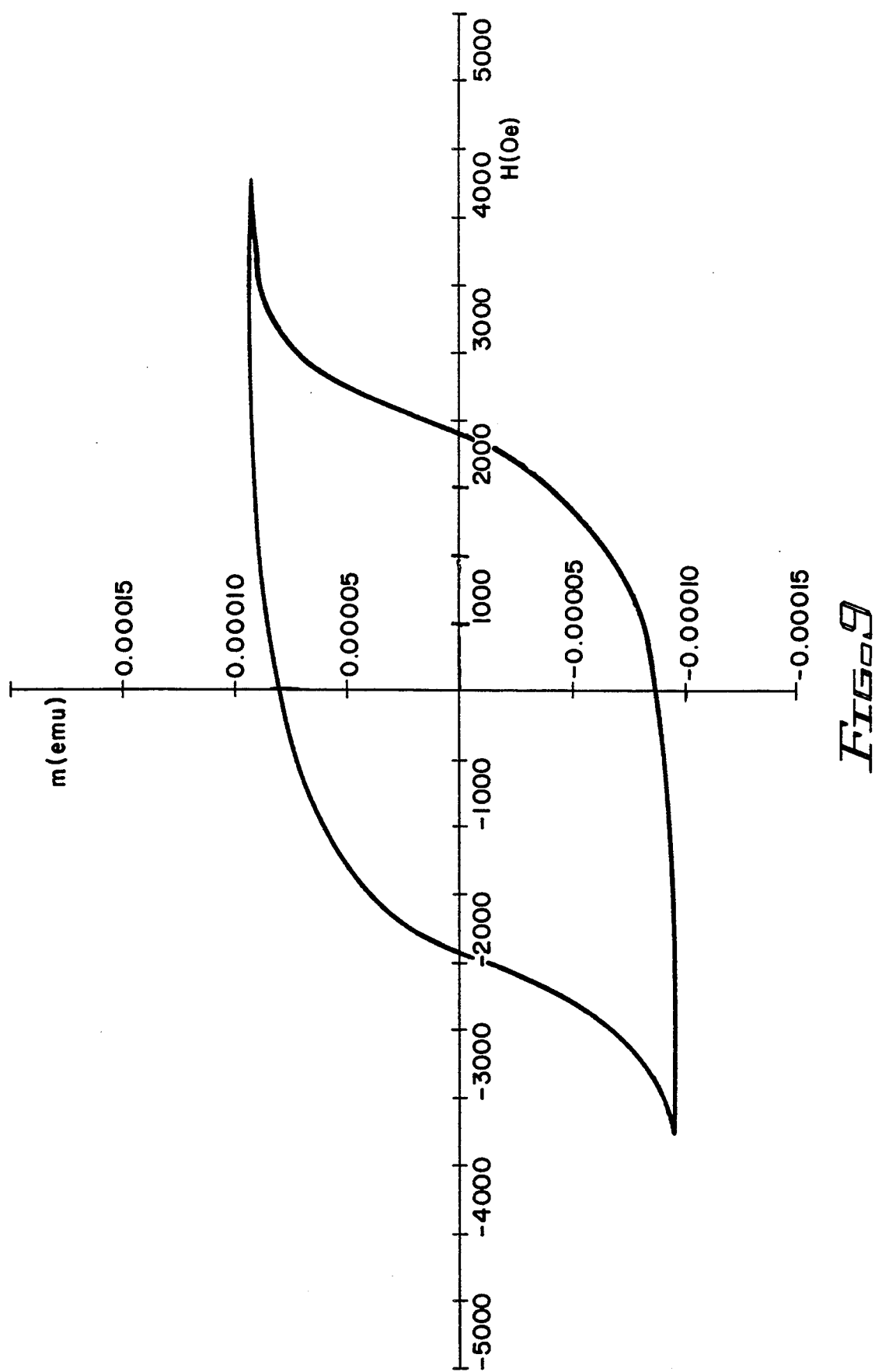
FIG. 9 is a graphical representation of the magnetic properties of a 200 angstroms thick Co-Pt-Cr film sputtered on a 100 angstrom chromium interlayer sputtered in an atmosphere of argon and oxygen onto a 100 angstroms thick layer of indium deposited onto a silicon dioxide substrate.

The magnetic effects of a textured TLM layer can be seen by comparing FIGS. 8 and 9. FIG. 8 is a graphical representation of the magnetic properties of a 200 angstroms thick layer of Co-Pt-Cr alloy film deposited in-situ on a 100 angstrom layer of chromium deposited in an atmosphere of argon onto a 100 angstrom TLM layer of indium deposited on a silicon dioxide substrate. FIG. 9 is a graphical representation of the magnetic properties of a structure created by depositing the same layers as the structure of FIG. 8, but with the chromium layer deposited in an atmosphere of oxygen and argon. The increase of coercivity H due to the presence of oxygen during chromium deposition becomes apparent when comparing the value of 898 Oe for the sample without oxygen present in FIG. 8 with the value of 1899 Oe for the sample in FIG. 9 where the chromium layer was deposited in an atmosphere of argon and oxygen. Referring to the graphical representations, there is also manifest a decrease in the B-H loop squareness when oxygen is present as indicated by the lower squareness ratio (SR) and coercive squareness ratio (S*) values. These results are summarized in the table below.

| Sputtering Atmosphere | Hc (Oe) | SR | S* |
| --- | --- | --- | --- |
| Argon | 898 | .894 | .863 |
| Argon/2% Oxygen | 1899 | .758 | .646 |

While there has been described and illustrated a preferred magnetic medium and a method of manufacturing such media and variations thereof, it will be apparent to those skilled in the art that further modifications and variations are possible without departing from the scope of the present invention as set forth in the following claims.

We claim:

1. A method of manufacturing a storage medium comprising the steps of:
   providing a substantially non-wettable substrate;
   depositing a transient liquid metal layer on said substrate while said substrate is maintained at a temperature in excess of the melting point of said transient liquid metal to form a distribution of molten metal spherical structures;
   maintaining said transient liquid metal layer in a liquid state while depositing in-situ an intermediate metal layer on said transient liquid metal layer in an atmosphere comprising oxygen and at least one inert gas; and
   depositing a magnetic layer on said intermediate metal layer.

2. A method of manufacturing a storage medium as set forth in claim 1 wherein said atmosphere is at a pressure of 5 to 50 millitorr during deposition of said intermediate metal layer.

3. A method of manufacturing a storage medium as set forth in claim 1 wherein said oxygen comprises 0.2% to 30% by volume of said atmosphere.

4. A method of manufacturing a storage medium as set forth in claim 1 wherein said substrate during deposition of said intermediate metal layer is at a temperature for maintaining said transient liquid metal layer in a liquid state.

5. A method of manufacturing a storage medium as set forth in claim 1 wherein said intermediate metal layer is selected from the group consisting of chromium, palladium, tantalum, molybdenum, vanadium, titanium, ruthenium, rhodium, niobium, aluminum, and alloys of these metals.

6. A method of manufacturing a storage medium as set forth in claim 1 wherein said transient liquid metal layer is selected from the group consisting of gallium, indium, tin, bismuth, lead, cadmium, mercury, selenium, tellurium and their alloys with other metals including silver, palladium, platinum, aluminum, gold, and binary and ternary compounds of the liquid metals.

7. A method of manufacturing a storage medium as set forth in claim 1 wherein said transient liquid metal layer and said magnetic layer are deposited by sputter deposition.

8. A method of manufacturing a storage medium as set forth in claim 1 wherein said transient liquid metal layer and said magnetic layer are deposited by ion beam deposition.

9. A method of manufacturing a storage medium in a deposition apparatus having a deposition chamber and means for supplying gas flow to said deposition chamber comprising the steps of:

provided a substantially non-wettable substrate;

depositing a transient liquid metal layer of a thickness on said substrate while said substrate is maintained at a temperature in excess of the melting point of said transient liquid metal to form a distribution of molten metal spherical structures;

maintaining said transient liquid metal layer in a liquid state while depositing an intermediate metal layer on said transient liquid metal layer in an atmosphere comprising oxygen and at least one inert gas; and depositing a magnetic layer on said intermediate metal layer.

10. A method of manufacturing a storage medium as set forth in claim 9 wherein said oxygen is supplied to said deposition chamber in combination with said at least one inert gas and said oxygen comprises 0.2 to 30% of said gas flow.

11. A method of manufacturing a storage medium as set forth in claim 9 wherein said oxygen comprises 0.2 to 30% of said gas flow.

12. A method of manufacturing a storage medium as set forth in claim 9 wherein said deposition chamber is maintained at a pressure of 5 to 50 millitorr during deposition of said intermediate metal layer.

13. A method of manufacturing a storage medium as set forth in claim 9 wherein said intermediate metal layer is selected from the group consisting of chromium, palladium, tantalum, molybdenum, vanadium, titanium, ruthenium, rhodium, niobium, aluminum, and alloys of these metals.

14. A method of manufacturing a storage medium as set forth in claim 9 further comprising the step of masking the substrate whereby said depositing a transient liquid metal layer deposits the transient liquid metal layer in a region of the substrate.

15. A method of manufacturing a storage medium as set forth in claim 9 wherein said thickness is selected for controlling the topology of said magnetic layer.

16. A method of manufacturing a storage medium as set forth in claim 9 wherein said transient liquid metal layer is selected from the group consisting of gallium, indium, tin, bismuth, lead, cadmium, mercury, selenium, tellurium and their alloys with other metals including silver, palladium, platinum, aluminum, gold, and binary and ternary compounds of the liquid metals.

17. A method of manufacturing a storage medium as set forth in claim 9 wherein said transient liquid metal comprises indium.

18. A method of manufacturing a storage medium as set forth in claim 9 wherein said magnetic layer is an alloy of which cobalt is a major constituent.

19. A method of manufacturing a storage medium as set forth in claim 9 wherein said substrate is selected from the group consisting of silicon dioxide, glass, amorphous carbon, polymers and metal substrates treated in such a manner as to be rendered substantially non-wettable to said transient liquid metal.

20. A method of controlling the surface topology of a magnetic storage medium comprising the steps of:

providing a substantially non-wettable substrate;

sputter depositing a transient liquid metal layer of a thickness on said substrate while said substrate is maintained at a temperature in excess of the melting point of said transient liquid metal to form a distribution of disconnected molten metal spherical structures and maintaining said transient liquid metal layer in a liquid state while sputter depositing in-situ an intermediate metal layer onto said transient liquid metal layer in an atmosphere comprising oxygen and at least one inert gas, whereby the thickness is selected for controlling the topology of the magnetic layer.

* * * * *